United States Patent
Hashimoto et al.

(10) Patent No.: US 10,263,272 B2
(45) Date of Patent: Apr. 16, 2019

(54) GAS FLOW PATH FORMING BODIES OF FUEL CELL, AND FUEL CELL

(71) Applicants: Keiji Hashimoto, Kariya-shi, Aichi-ken (JP); Kousuke Kawajiri, Kariya-shi, Aichi-ken (JP); Satoshi Futami, Kariya-shi, Aichi-ken (JP)

(72) Inventors: Keiji Hashimoto, Kariya (JP); Kousuke Kawajiri, Kariya (JP); Satoshi Futami, Kariya (JP)

(73) Assignee: Toyota Shatai Kabushiki Kaisha, Kariya-shi, Aichi-ken (JP)

( * ) Notice: Subject to any disclaimer, the term of this patent is extended or adjusted under 35 U.S.C. 154(b) by 167 days.

(21) Appl. No.: 14/421,946

(22) PCT Filed: Jan. 23, 2014

(86) PCT No.: PCT/JP2014/051346
§ 371 (c)(1),
(2) Date: Feb. 16, 2015

(87) PCT Pub. No.: WO2014/132706
PCT Pub. Date: Sep. 4, 2014

(65) Prior Publication Data
US 2015/0236368 A1    Aug. 20, 2015

(30) Foreign Application Priority Data
Feb. 28, 2013 (JP) .................................. 2013-039098

(51) Int. Cl.
*H01M 8/242* (2016.01)
*H01M 8/24* (2016.01)
(Continued)

(52) U.S. Cl.
CPC .......... *H01M 8/242* (2013.01); *H01M 8/0254* (2013.01); *H01M 8/2445* (2013.01); *H01M 2008/1095* (2013.01)

(58) Field of Classification Search
None
See application file for complete search history.

(56) References Cited

U.S. PATENT DOCUMENTS

| | | |
|---|---|---|
| 2006/0051654 A1 | 3/2006 | Beutel et al. |
| 2007/0122682 A1 | 5/2007 | Hong |

(Continued)

FOREIGN PATENT DOCUMENTS

| | | |
|---|---|---|
| JP | 2005-294120 A | 10/2005 |
| JP | 2007-149690 A | 6/2007 |

(Continued)

OTHER PUBLICATIONS

International Preliminary Report on Patentability for PCT/JP2014/051346, dated Sep. 1, 2015, 5 pgs.

(Continued)

*Primary Examiner* — Wyatt P McConnell
(74) *Attorney, Agent, or Firm* — Patterson Thuente Pedersen, P.A.

(57) ABSTRACT

A gas passage forming body for a fuel battery includes gas passages and water guide passages. A communication passage is arranged between one of the water guide passages and a gas passage that is adjacent to the water guide passage and is in communication with the adjacent gas passage and water guide passage to permit water to move therethrough. An aid portion is arranged at water drainage ends of two adjacent ones of the water guide passages and aids bonding of water drained from the water drainage ends of the two adjacent ones of the water guide passages. Thus, water drainage from the water guide passages of the gas passage (Continued)

forming body is improved, and water in the gas passages is reduced. As a result, the battery performance of the fuel battery is improved due to an improvement in gas diffusion.

6 Claims, 8 Drawing Sheets

(51) Int. Cl.
*H01M 8/0254* (2016.01)
*H01M 8/1018* (2016.01)

(56) References Cited

U.S. PATENT DOCUMENTS

2011/0195335 A1\* 8/2011 Goebel ............... H01M 8/0228
   429/479
2012/0028139 A1   2/2012 Kawajiri et al.

FOREIGN PATENT DOCUMENTS

| JP | 2007-250480 A | 9/2007 |
| JP | 2008-512830 A | 4/2008 |
| JP | 2011-150801   | 8/2011 |
| JP | 2011-165559 A | 8/2011 |
| JP | 2012-014846 A | 1/2012 |
| WO | WO 2010/113534 A1 | 10/2010 |

OTHER PUBLICATIONS

International Search Report (3 pgs.) with English translation (2 pgs.) for PCT/JP2014/051346, dated Mar. 11, 2014, 5 total pgs.

\* cited by examiner

GAS FLOW PATH FORMING BODIES OF FUEL CELL, AND FUEL CELL

RELATED APPLICATIONS

The present application is a National Phase entry of PCT Application No. PCT/JP2014/051346, filed Jan. 23, 2014, which application claims priority to Japanese Patent Application No. 2013-039098, filed Feb. 28, 2013, both of said applications being hereby incorporated by reference in their entirety.

TECHNICAL FIELD

The present invention relates to a gas passage forming body of a fuel battery and to a fuel battery.

BACKGROUND ART

Patent document 1 describes a fuel battery that includes a solid polymer electrolyte membrane and electrode catalyst layers arranged on both surfaces of the electrolyte membrane. A gas diffusion layer is laminated on an outer side of each electrode catalyst layer to form a membrane electrode assembly. A gas passage forming body is arranged between the membrane electrode assembly and a separator. Water guide passages are arranged between the gas passage forming body and the separator. Water is generated by an electrode reaction at the membrane electrode assembly and drained into the water guide passages through communication passages extending between the gas passages and the water guide passages.

When the above fuel battery is operated under a condition in which a large amount of water is generated by the electrode reaction, such as a high load condition or a high moisture condition, the water guide passages cannot sufficiently drain the water. Thus, the generated water overflows into the gas passages from the water guide passages through the communication passages and blocks the gas passages. This impedes gas diffusion and lowers the battery performance of the fuel battery.

Patent document 2 describes a fuel battery including a plurality of groove-shaped gas passages. End portions of the gas passages are arranged in a staggered layout. This increases the size (surface area) of water droplets generated at the end portions of the gas passages compared to when there is only one gas passage. Thus, the generated water may be forced out of the passages with a smaller gas pressure. This improves water drainage.

Patent document 3 describes a fuel battery including gas passages that are wider at a downstream side so that the passage cross-sectional area of each gas passage increases toward the downstream side. This limits blocking resulting from the generated water and improves water drainage.

PRIOR ART DOCUMENTS

Patent Documents

Patent Document 1: Japanese Laid-Open Patent Publication No. 2011-150801
Patent Document 2: Japanese National Phase Laid-Open Patent Publication No. 2008-512830
Patent Document 3: Japanese Laid-Open Patent Publication No. 2007-250480

SUMMARY OF THE INVENTION

Problems that are to be Solved by the Invention

Patent document 1 does not propose a technique for improving the draining of water, such as the generated water in the water guide passages. In patent document 2, it is difficult to form the end portions of the groove-shaped gas passages in a staggered layout and diffuse gas to the electrode. Patent documents 2 and 3 describe the problem of the drainage of water, such as the generated water overflowing into the gas passages. However, Patent documents 2 and 3 do not disclose a technique that inhibits the overflow of the generated water in the water guide passages into the gas passages to improve water drainage from the water guide passages.

It is an object of the present invention to provide a gas passage forming body for a fuel battery and a fuel battery including the gas passage forming body that improve water drainage from water guide passages of the gas passage forming body and reduce water in gas passages. This improves gas diffusion and the battery performance of the fuel battery.

Means for Solving the Problem

To solve the problem, the present invention provides a gas passage forming body for a fuel battery that includes a membrane electrode assembly and a separator. The membrane electrode assembly includes a solid polymer electrolyte membrane and electrode catalyst layers laminated on an anode surface and a cathode surface of the solid polymer electrolyte membrane. The gas passage forming body is arranged between the membrane electrode assembly and the separator. The gas passage forming body includes a plurality of gas passages and a plurality of water guide passages. A communication passage is arranged between one of the water guide passages and a gas passage that is adjacent to the water guide passage and is in communication with the water guide passage and the gas passage, which are adjacent to each other, to permit water to move therethrough. An aid portion is arranged at water drainage ends of two adjacent ones of the water guide passages. The aid portion aids bonding of water drained from the water drainage ends of the two adjacent ones of the water guide passages.

Preferably, the gas passages are groove-shaped, the water guide passages are separated from the gas passages by a partition wall, and the aid portion extends in a direction in which the water guide passages are adjacent to each other.

Preferably, the aid portion is arranged at water drainage ends of all or some of the water guide passages.

Preferably, the aid portion is flat.

Preferably, the aid portion has a height lower than that of the water guide passages.

Additionally, the present invention provides a fuel battery that includes a plurality of stacked unit cells. Each of the unit cells includes a membrane electrode assembly. Each of the membrane electrode assemblies includes a solid polymer electrolyte membrane, electrode catalyst layers laminated on an anode surface and a cathode surface of the solid polymer electrolyte membrane, and a gas diffusion layer laminated on an outer side of each of the electrode catalyst layers. Each of the unit cells further includes a gas passage forming body, which is stacked on each of the gas diffusion layers of the membrane electrode assembly, and two separators sandwiching the membrane electrode assembly. Preferably, at least one of the gas passage forming bodies has the structure of the above gas passage forming body.

Effects of the Invention

The present invention succeeds in improving water drainage from water guide passages of a gas passage forming body and in reducing water in gas passages. This results in an improvement of gas diffusion and obtains an improved battery performance of a fuel battery.

MODES FOR CARRYING OUT THE INVENTION

First Embodiment (1. Structure)

A first embodiment of the present invention will now be described with reference to FIGS. 1 to 5(d).

Figure 1:
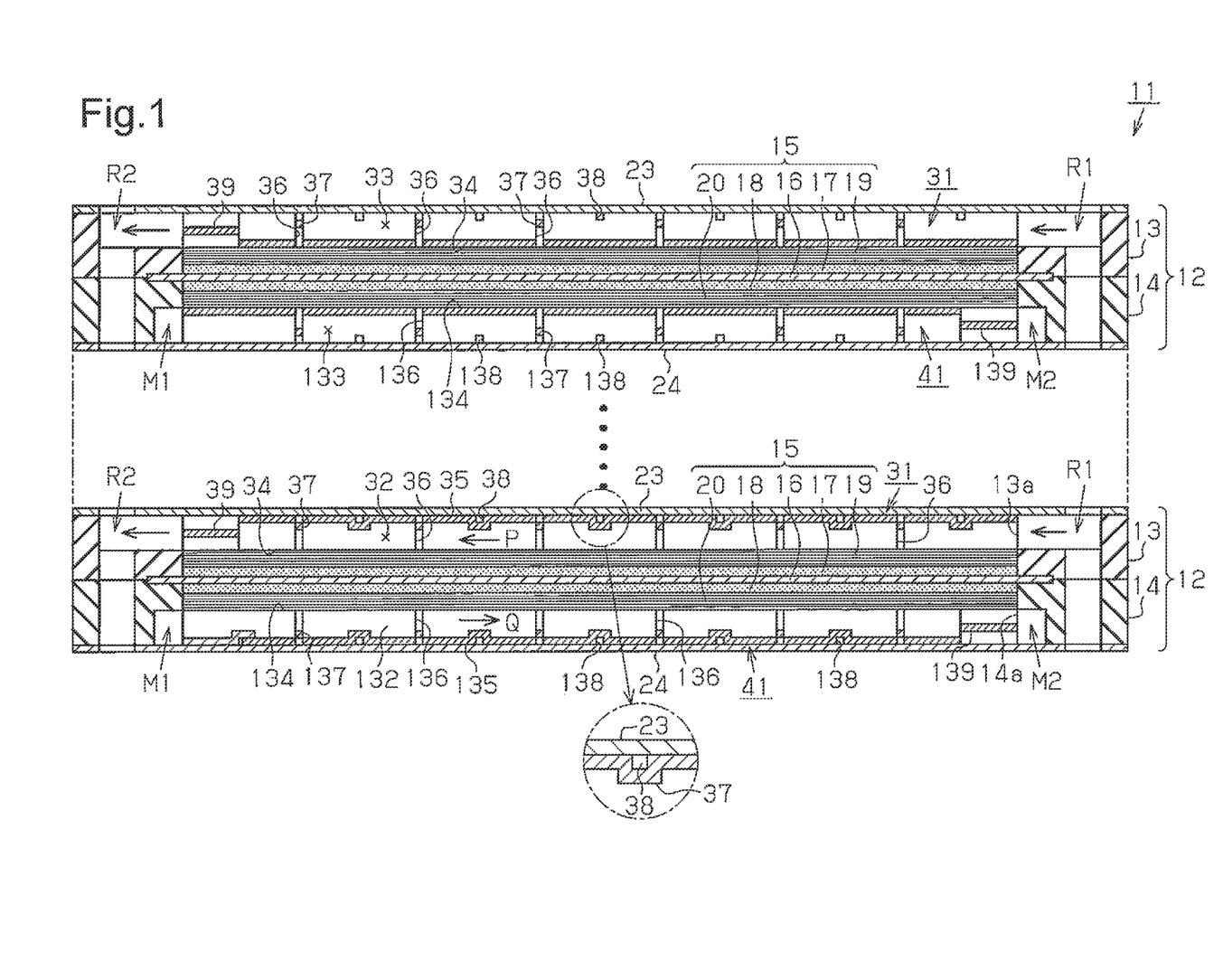
FIG. 1 is a cross-sectional view showing a fuel battery according to a first embodiment of the present invention.

A shown in FIG. 1, a fuel battery 11 according to the first embodiment is of a solid polymer electrolyte type and has a stack structure including a large number of stacked unit cells 12 and a coolant passage (not shown).

Each of the unit cells 12 includes a membrane electrode assembly (MEA) 15 in first and second frames 13 and 14, each of which is tetragonal and formed from a synthetic resin, such as synthetic rubber. The interior of the first frame 13 includes a fuel gas passage space 13a. The interior of the second frame 14 includes an oxidant gas passage space 14a.

The membrane electrode assembly 15 is arranged between the frames 13 and 14. Each of the unit cells 12 includes a first gas passage forming body 31, which is accommodated in the fuel gas passage space 13a and formed from a ferrite stainless steel (SUS), a titanium alloy, or carbon, and a second gas passage forming body 41, which is accommodated in the oxidant gas passage space 14a and formed from a ferrite stainless steel (SUS), a titanium alloy, carbon, a titanium alloy plated with gold, or a gold alloy. The unit cell 12 also includes a first separator 23 and a second separator 24, each of which is flat and formed from a ferrite stainless steel (SUS), a titanium alloy, or carbon. The first separator 23 is bonded to the first frame 13 with a seal ring (not shown). The second separator 24 is bonded to the second frame 14 and a lower surface (in FIG. 1) of the second gas passage forming body 41 with a seal ring (not shown).

The membrane electrode assembly 15 is formed by a solid polymer electrolyte membrane 16, a first electrode catalyst layer 17, a second electrode catalyst layer 18, a first gas diffusion layer 19, and a second gas diffusion layer 20.

The first electrode catalyst layer 17 is formed by depositing a catalyst on a surface of the electrolyte membrane 16 at an anode side, that is, an upper surface in FIG. 1. The second electrode catalyst layer 18 is formed by depositing a catalyst on a surface of the electrolyte membrane 16 at a cathode side, that is, a lower surface in FIG. 1. The solid polymer electrolyte membrane 16 is formed from a solid polymer material having satisfactory proton conductivity under a moist condition. Examples of such a solid polymer material include a fluorinated polymer membrane (e.g., Nafion membrane manufactured by Du Pont). The electrode catalyst layers 17 and 18 each include carbon particles (not shown). A large number of catalyst particles formed from platinum (Pt) are deposited on the carbon particle surfaces. The catalysis of the catalyst particles improves power generation efficiency of the fuel battery. The platinum (Pt) contained in the electrode catalyst layers 17 and 18 functions to enhance separation of hydrogen into a proton and an electron and a reaction to generate water from oxygen, protons, and electrons. Any other material may be used as long as it has the same effects as platinum.

The conductive first gas diffusion layer 19 is laminated on the electrode catalyst layer 17 at the anode side. The conductive second gas diffusion layer 20 is laminated on the electrode catalyst layer 18 at the cathode side. The gas diffusion layers 19 and 20 are usually formed by carbon paper or carbon cloth.

The first gas passage forming body 31 and the second gas passage forming body 41 will now be described. The first gas passage forming body 31 located at the anode side and the second gas passage forming body 41 located at the cathode side have the same structure. Thus, the structure of the first gas passage forming body 31 will be mainly described. Needless to say, they may have different structures. In FIGS. 1 to 5(d), the components of the second gas passage forming body 41 are each given a reference numeral obtained by adding one hundred to the reference numeral of the corresponding component of the first gas passage forming body 31 and will not be described below. Thus, regarding the second gas passage forming body 41, "first separator 23", "the gas diffusion layer 19", and "fuel gas flow direction P" in the description below are to be respectively replaced by "second separator 24", "second gas diffusion layer 20", and "oxidant gas flow direction Q". Additionally, regarding the components of the second gas passage forming body 41, one hundred is added to each reference numeral (32 to 39) of the corresponding components of the first gas passage forming body 31.

Figures 2A, 2B:
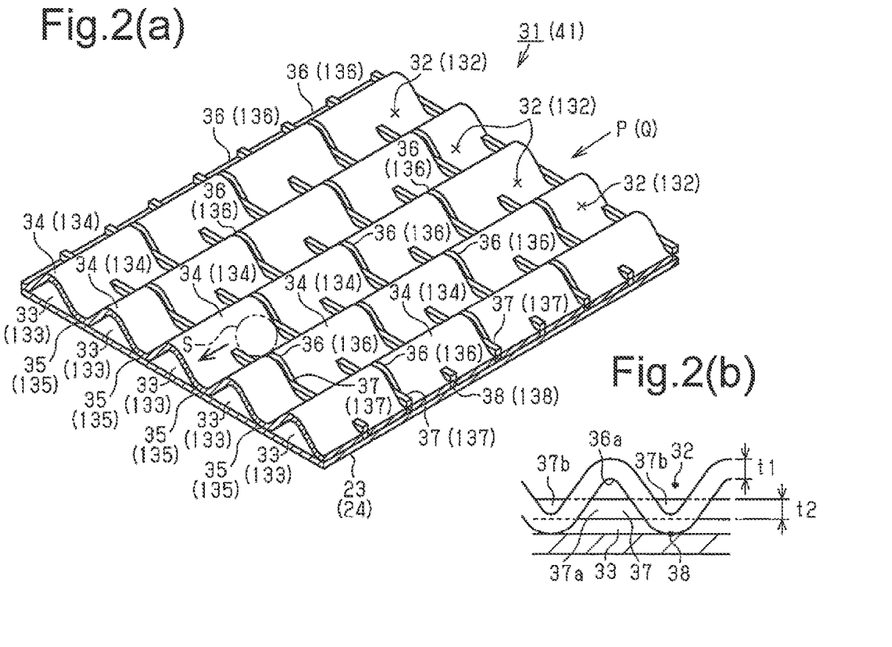
FIG. 2(a) is a partial perspective view showing first and second gas passage forming bodies of the first embodiment.
FIG. 2(b) is a diagram illustrating a gas passage and a water guide passage of the first embodiment.

In FIG. 2(a), the direction in which fuel gas flows is indicated by the arrow P. As shown in FIG. 2(a), groove-shaped gas passages 32 extending in straight lines are formed on the surface of the first gas passage forming body 31 that is closer to the gas diffusion layer 19 (upper surface in FIG. 2(a)). Water guide passages 33 extending in straight lines are located on the surface of the first gas passage forming body 31 that is closer to the first separator 23 (lower surface in FIG. 2(a)). A partition wall separates the gas passages 32 from the water guide passages 33. In the present embodiment, the first gas passage forming body 31 has a cross-section of a sine curve wave when cut in a direction orthogonal to the fuel gas flow direction P. The cross-sectional shape of the first gas passage forming body 31 does not have to be a sine curve wave and may be, for example, another wave shape such as a rectangular wave, a trapezoidal wave, and a triangular wave. The gas passages 32 are formed between projections 34, which extend side by side in the fuel gas flow direction P and project toward the gas diffusion layer 19. The water guide passages 33 are formed between projections 35, which extend side by side in the fuel gas flow direction P and project toward the first separator 23.

As shown in FIGS. 2(a) and 2(b), the first gas passage forming body 31 includes ribs 37 arranged in the direction orthogonal to the fuel gas flow direction P at predetermined pitches. The ribs 37 are formed by pressing the projections 34 and 35.

As shown in FIG. 2(b), each rib 37 includes a portion (hereinafter, referred to obstruction plate 37a) that is located in one of the water guide passages 33 and bridges the projections 35 and a portion 37b that is located in one of the gas passages 32. As shown in the same drawing, the obstruction plate 37a of each rib 37 is located between the peaks of the projections 35 and is longer than the portion 37b, which is located at a rear side of one of the projections 35. Therefore, when a gas passage 32 and a water guide passage 33 are cut along the ribs 37, the water guide passage 33 has a smaller cross-sectional area than that of the gas passage 32. The gas passage 32 has a substantially larger cross-sectional open area than that of the water guide passage 33 due to the existence of the obstruction plate 37a. Thus, gas mainly flows in the gas passages 32.

As shown in FIG. 2(a), the portions 37b are used to guide water droplets S captured at the portions 37b to communication passages 36.

As shown in FIGS. 1 and 2(b), each rib 37 includes a passage 38 in a longitudinal direction of the rib 37. The passage 38 allows water to move between adjacent ones of the water guide passages 33. In the present embodiment, the first gas passage forming body 31 is formed from a single metal plate. Thus, as shown in FIG. 2(b), the thickness t2 of each rib 37 is substantially the same as the thickness t1 of the wave-shaped portion of the first gas passage forming body 31. However, the two thicknesses are not limited to substantially the same value.

As shown in FIG. 1, the peak of each projection 34 contacts the gas diffusion layer 19, and the peak of each projection 35 contacts the first separator 23. The unit cell 12 located at the uppermost end in FIG. 1 is cut so that the cross-section shows the water guide passages 33 in the drawing, and the unit cell 12 located at the lowermost end in FIG. 1 is cut so that the cross-section shows the gas passages 32 in the drawing.

Referring to FIG. 1, each projection 34 includes communication passages 36 and openings 36a at portions corresponding to the obstruction plates 37a in the direction orthogonal to the fuel gas flow direction P (i.e., direction in which the gas passages 32 extend). The communication passages 36 and the openings 36a, which communicate the gas passages 32 and the water guide passages 33, are pressed and cut during the formation of the ribs 37 (refer to FIG. 3). The communication passages 36 and the openings 36a each have a cross-sectional shape and an open area that produces a capillary action.

Figure 3:
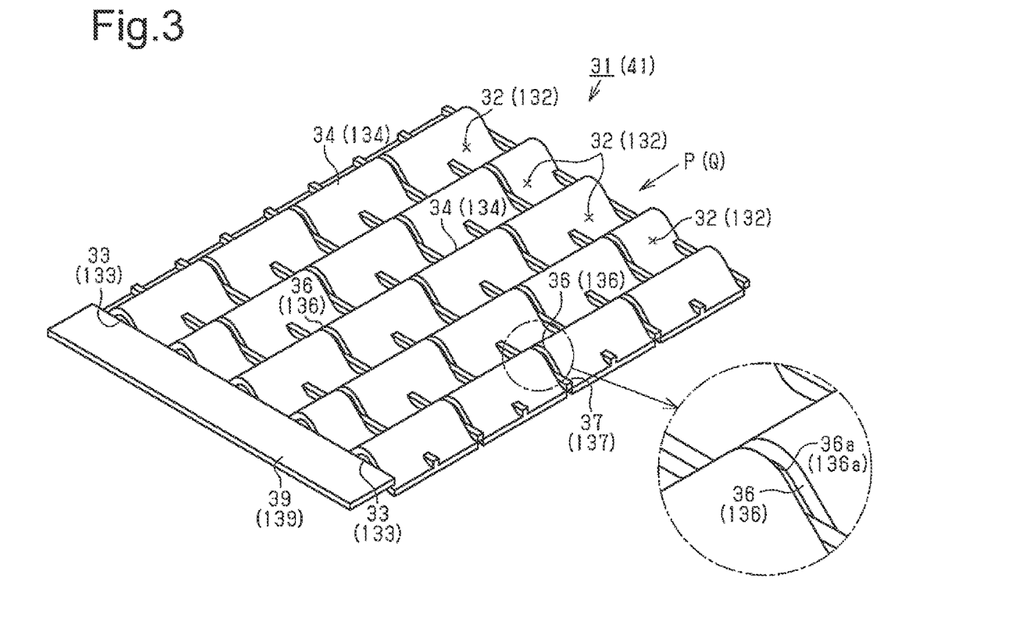
FIG. 3 is a partial perspective view showing water drainage ends of the first and second gas passage forming bodies of the first embodiment.

As shown in FIGS. 1 and 3, an aid portion 39 is arranged at a water drainage end, which corresponds to downstream ends of the water guide passages 33. The aid portion 39 is integrally coupled to downstream end surfaces of the projections 34 and 35 and extends in a direction in which the water guide passages 33 are adjacent to one another. The aid portion 39 also extends over the entire water guide passages 33. That is, the aid portion 39 is separated from the separator 23. As shown in FIGS. 1 and 3, the height of the aid portion 39 is less than the distance of the water guide passages 33 from the first separator 23, that is, the height of the water guide passages 33. The height of the aid portion 39 is the distance from the first separator 23 to a portion of the water guide passages 33 that is farthest from the first separator 23. In the same manner, the height of the aid portion 139 is the distance from the second separator 24 to a portion of the water guide passages 133 that is farthest from the second separator 24.

The aid portion 39 of the present embodiment is flat but is not limited to a flat shape.

The arrangement of the aid portion 39 aids the bonding of water that is drained from the water drainage end of one of the water guide passages 33 to water that is drained from adjacent one of the water guide passages 33 to form a large droplet. In the same manner, the aid portion 139 is arranged in the second gas passage forming body 41. This aids the bonding of water drained from the water drainage end of one of the water guide passages 133 to water drained from adjacent one of the water guide passages 133 to form a large droplet.

The height of the aid portions is set to be less than that of the water guide passages 33 and 133. This allows the aid portions 39 and 139 to promptly and reliably capture even a small droplet drained from the water drainage ends of the water guide passages 33 and 133 and aids the bonding of water droplets drained from adjacent ones of the water guide passages.

As shown in FIG. 1, the frames 13 and 14 and the separators 23 and 24 of each unit cell 12 include an intake passage R1, through which fuel gas (hydrogen gas) is supplied from a fuel gas supply source (e.g., hydrogen tank) (not shown) to the fuel gas passages 32, and a discharge passage R2, through which fuel offgas supplied for power generation is discharged to the exterior.

Also, the frames 13 and 14 and the separators 23 and 24 of the unit cell 12 include an intake passage M1, through which oxidant gas (air) is delivered from an oxidant gas supply source (e.g., compressor) (not shown) to the oxidant gas passages 132, and a discharge passage M2, through which oxide offgas supplied for power generation is discharged to the exterior.

(2. Operation)

The operation of the fuel battery 11 having the above structure will now be described.

In FIG. 1, fuel (hydrogen) gas, which is supplied from the intake passage R1 to the gas passages 32, flows through the gas passages 32 in the fuel gas flow direction P (direction to the left in FIG. 1). The fuel gas diffuses and moves through the first gas diffusion layer 19 in the gas passages 32. This evenly supplies the fuel gas to the first electrode catalyst layer 17. In FIG. 1, oxidant (oxygen) gas, which is supplied from the compressor through the intake passage M1 to the gas passages 132 of the second gas passage forming body 41, flows through the gas passages 132 in the oxidant gas flow direction Q (direction to the right in FIG. 1). The oxidant gas diffuses and moves through the second gas diffusion layer 20 in the gas passages 132. This evenly supplies the oxidant gas to the second electrode catalyst layer 18. The supply of the fuel (hydrogen) gas and the oxidant (oxygen) gas causes an electrode reaction in the membrane electrode assembly 15 and generates power. This results in the fuel battery 11, which includes the stacked unit cells 12 and the coolant passage (not shown), outputting desired power.

As shown in FIG. 1, some of the fuel gas, which was not used to generate power, is discharged as fuel offgas from the fuel gas passages 32 through the discharge passage R2 to the exterior. The oxidant gas, which was not used to generate power, is discharged as oxidant offgas from the gas passages 132 through the discharge passage M2 to the exterior.

Figure 4A:
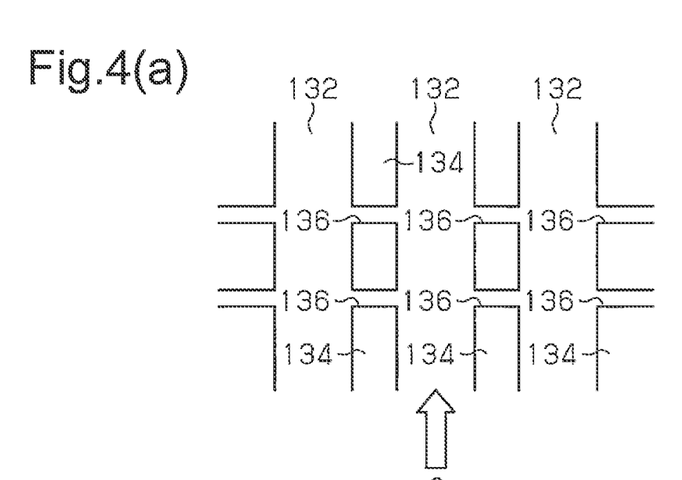
FIGS. 4(a) and 4(b) are schematic diagrams of gas passages and communication passages of the first embodiment.
Figure 4B:
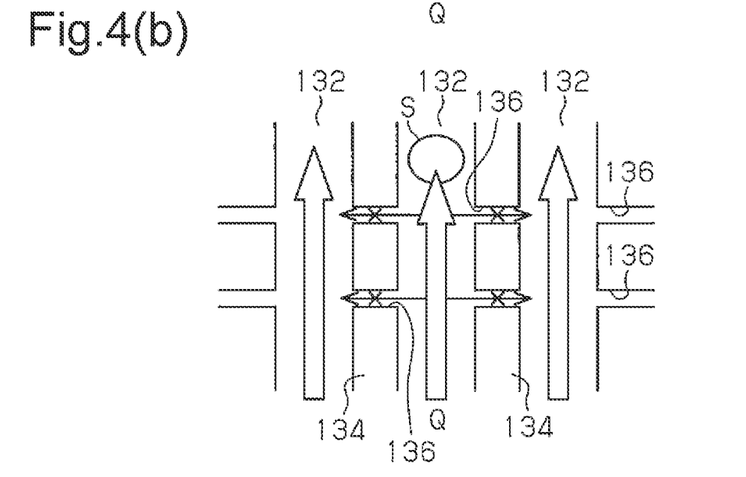

The electrode reaction in the membrane electrode assembly 15 generates water in the gas passages 132 of the second gas passage forming body 41 at the cathode side. As shown in FIGS. 4(a) and 4(b), some of the generated water is discharged to the discharge passage M2 by the fluid pressure of the oxidant gas flowing through the gas passages 132. That is, when the fuel battery is in a high load condition, the oxidant gas does not flow through communication passages 136 but flows through the gas passages 132 as pushing out the water. Further, some of the water, which flows through the communication passages 136 to the water guide passages 133, is drained into the discharge passage M2.

Figure 5A:
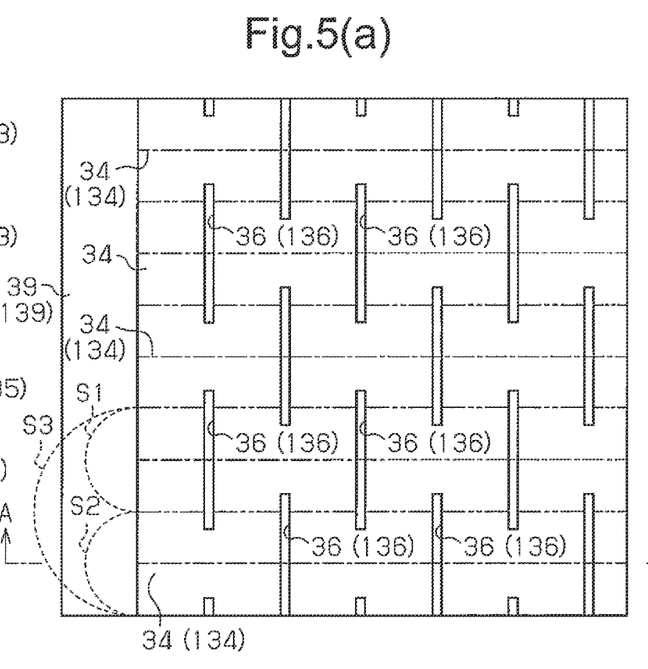
FIG. 5(a) is a partially simplified plan view showing the first and second gas passage forming bodies of the first embodiment.

As shown in FIG. 5(a), when discharged from the water drainage ends of the water guide passages 133, the generated water has droplet sizes indicated by broken lines S1 and S2 in correspondence with the sizes of the water drainage ends of the water guide passages 133 due to the capillary action. In FIG. 5(a), the single-dashed line indicates a ridge line of the peak of the projection 34, and the double-dashed line indicates a deepest portion of the gas passage 32. These indications are the same in FIGS. 6(b), 7(b), and 8(b), which show other embodiments.

Figure 5B:
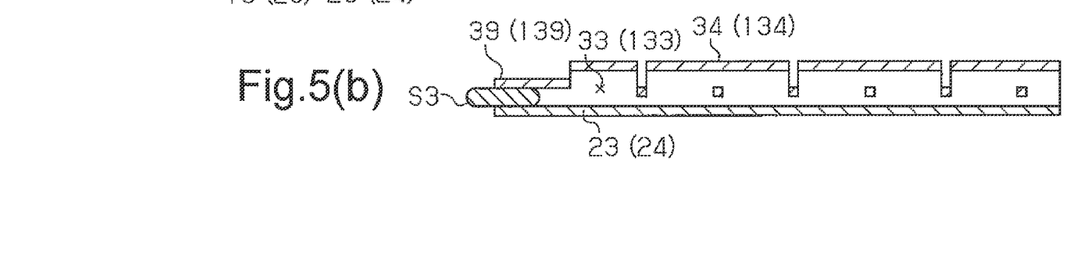
FIG. 5(b) is a cross-sectional view taken along line A-A of FIG. 5(a).
Figure 5C:
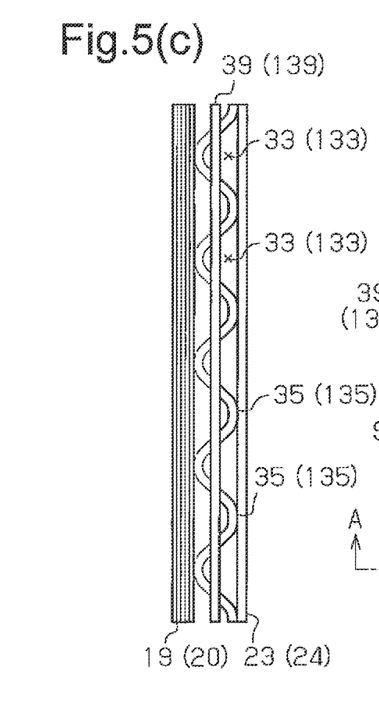
FIGS. 5(c) and 5(d) are side views showing the first and second gas passage forming bodies of the first embodiment as viewed from opposite ends.
Figure 5D:
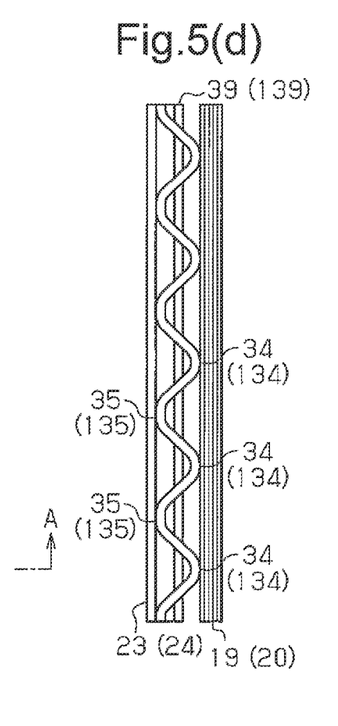

When the gas pressure moves the generated water from the water guide passages 133 toward a water drainage side, adjacent water droplets bond together and form a droplet having the size indicated by broken lines S3. As shown in FIGS. 5(a) and 5(b), the droplet having the size indicated by the broken lines S3 has a size (radius) that is larger than the droplet size (radius) indicated by the broken lines S1 and S2. Thus, a smaller pressure is needed to push out such a droplet that has the size indicated by the broken lines S3. That is, water can be drained even when using gas having a low flow rate and a low pressure loss.

The oxidant gas in the gas passages 132 has a higher pressure than the fuel gas in the gas passages 32. Thus, the pressure difference causes some of the generated water to osmose through the second electrode catalyst layer 18, the solid polymer electrolyte membrane 16, the first electrode catalyst layer 17, and the first gas diffusion layer 19 at the cathode side to flow into the fuel gas passages 32 as osmosis water. The osmosis water is discharged to the discharge passage R2 by the fluid pressure of the fuel gas flowing through the gas passages 32.

In this case, in the same manner as the generated water described above, gas does not flow through the communication passages 36 but flows through the gas passages 32 while forcing out the osmosis water during a high load condition. Additionally, some of the osmosis water flows to the water guide passages 33 through the communication passages 36 and is drained into the discharge passage R2. When drained from the water drainage ends of the water guide passages 33, the osmosis water has droplet sizes indicated by the broken lines S1 and S2 in correspondence with the sizes of the water drainage ends of the water guide passages 33 due to the capillary action. When the gas pressure moves the osmosis water from the water guide passages 33 toward the water drainage side, adjacent water droplets bond together and form a droplet having the size indicated by the broken lines S3. In the same manner as the generated water, the droplet can be forced out by a small pressure. That is, water can be drained even when using gas having a low flow rate and a low pressure loss.

As a result, the generated water and the osmosis water do not remain in the water guide passages 33 and 133 of the present embodiment. Thus, an overflow of the generated water and the osmosis water to the gas passages is limited under a high load condition. This improves the gas diffusion characteristics and obtains a uniform electrode reaction in the membrane electrode assembly 15, that is, obtains a uniform current distribution. Consequently, the power generation performance is improved.

Accordingly, the fuel battery and the gas passage forming bodies of the present embodiment have the advantages described below.

(1) The fuel battery and the gas passage forming bodies of the present embodiment include a plurality of the water guide passages 33 and 133 between adjacent ones of the gas passages 32 and 132 to drain water. Additionally, the communication passages 36 and 136 are arranged between the water guide passages 33 and 133 and the gas passages 32 and 132 that are adjacent to the water guide passages 33 and 133. Water moves through the communication passages 36 and 136, which communicate the gas passages and the adjacent water guide passages. The aid portions 39 and 139 are arranged at the water drainage ends of adjacent ones of the water guide passages 33 and 133. The aid portions 39 and 139 aid the bonding of water drained from the adjacent ones of the water guide passages 33 and 133. As a result, the fuel battery and the gas passage forming bodies of the present embodiment improve water drainage characteristics of the water guide passages in the gas passage forming body and reduce water in the gas passages, which leads to improved gas diffusion. This improves the battery performance of the fuel battery. That is, an overflow of the generated water and the osmosis water to the gas passages are limited during a high load condition. This improves gas diffusion and obtains a uniform electrode reaction in the membrane electrode assembly 15, that is, obtains a uniform current distribution. Consequently, the power generation performance is improved. Additionally, water can be drained even from a passage having a low pressure loss. This increases the degree of freedom for designing passages.

(2) The fuel battery and the gas passage forming bodies of the present embodiment include the groove-shaped gas passages 32 and 132. The partition walls separate the water guide passages 33 and 133 from the gas passages 32 and 132. Additionally, the aid portions 39 and 139 extend in a direction in which the water guide passages 33 and 133 are adjacent to one another.

Therefore, the present embodiment can easily realize advantage (1) by extending the aid portions 39 and 139 in the direction in which the water guide passages 33 and 133 are adjacent to one another.

(3) The fuel battery and the gas passage forming bodies of the present embodiment include the flat aid portions that aid the bonding of water drained from the water drainage ends of the water guide passages 33 and 133. The flat aid portions reliably capture water droplets discharged from the water drainage ends of the water guide passages 33 and 133 and aid the bonding of water droplets discharged from adjacent ones of the water guide passages. Thus, advantage (1) can be easily realized.

(4) In the fuel battery and the gas passage forming bodies of the present embodiment, the aid portions 39 and 139 are arranged at the entire water drainage ends of the water guide passages. Thus, the aid portions arranged at the entire water drainage ends of the water guide passages aid the bonding of water droplets drained from the water guide passages and improve the drainage of captured water droplets.

(5) In the fuel battery and the gas passage forming bodies of the present embodiment, the aid portions 39 and 139 have a height lower than that of the water guide passages 33 and 133. Therefore, compared to when the aid portions 39 and 139 are taller than the water guide passages 33 and 133, water droplets are reliably captured when discharged from the water drainage ends of the water guide passages, water droplets can be easily bonded when discharged from adjacent ones of the water guide passages, and the drainage of the captured water droplets can be improved.

Second Embodiment

A second embodiment will now be described with reference to FIGS. 6(a) to 6(c). Hereafter, in the description of embodiments including the second embodiment, the same reference numerals are given to those components that are the same as or equivalent to the corresponding components in the first embodiment. Such components will not be described in detail.

In the first embodiment, the aid portions 39 and 139 are integrally coupled to the downstream end surfaces of the projections 34 and 134 and the projections 35 and 135. Also, the aid portions 39 and 139 extend in the direction, in which the water guide passages 33 and 133 are adjacent to one another, and over the entire water guide passages 33 and 133.

Figure 6A:
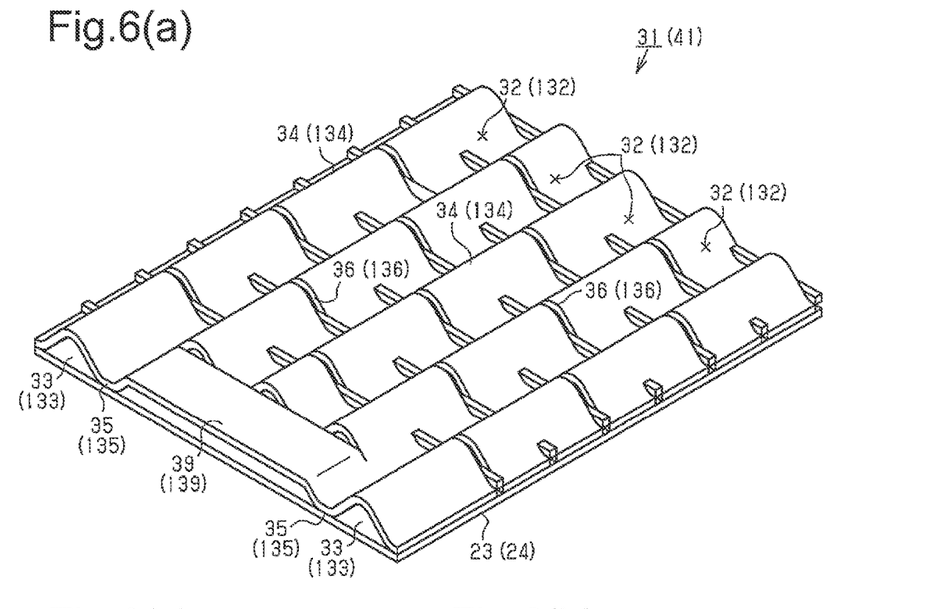
FIG. 6(a) is a perspective view showing first and second gas passage forming bodies according to a second embodiment of the present invention.
Figures 6B, 6C:
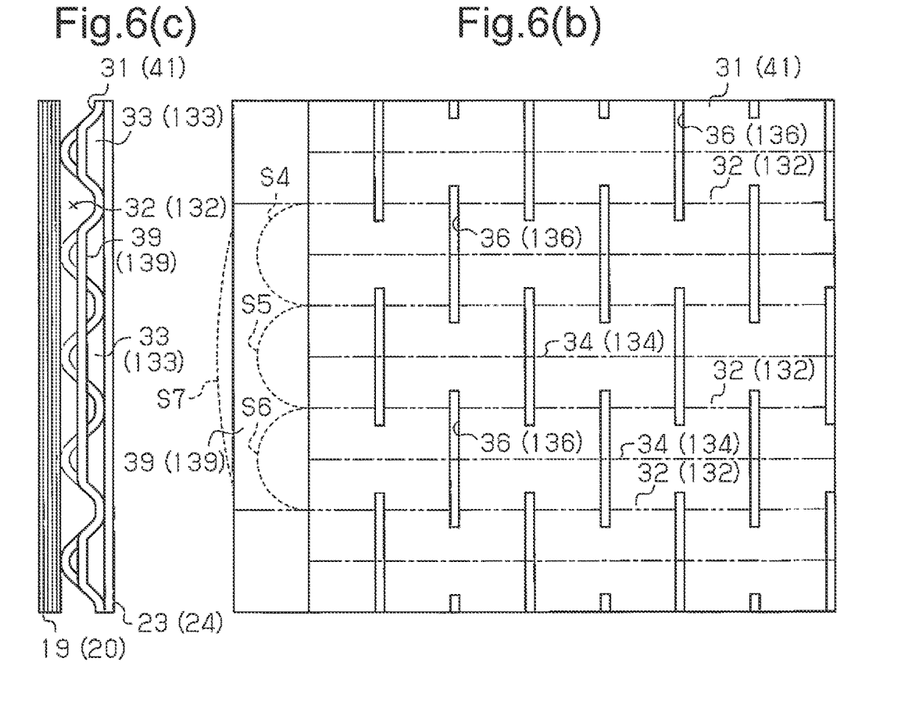
FIG. 6(b) is a partially simplified plan view showing the first and second gas passage forming bodies of the second embodiment.
FIG. 6(c) is a side view showing the first and second gas passage forming bodies of the second embodiment as viewed from an end.

In the second embodiment, as shown in FIGS. 6(a) to 6(c), aid portions 39 and 139 do not extend over the entire water guide passages 33 and 133 but extend over adjacent ones (e.g., three) of the water guide passages 33 and 133. The aid portions 39 and 139 are integrally coupled to the downstream end surfaces of the projections 34, 134, 35, and 135 and extend in a direction in which the water guide passages 33 and 133 are adjacent to one another. The other structure is the same as that in the first embodiment.

As shown in FIG. 6(b), in such a structure, the water discharged from the water drainage ends of the water guide passages 33 has droplet sizes indicated by broken lines S4 to S6 in correspondence with the sizes of the water drainage ends of the water guide passages 33 due to the capillary action. When the gas pressure moves the water from the water guide passages 33 toward the water drainage side, adjacent water droplets bond together and form a droplet having the size indicated by broken lines S7. Thus, the droplet can be forced out by a small pressure. That is, water can be drained even when using gas having a low flow rate and a low pressure loss.

Accordingly, the second embodiment obtains advantages (1) to (5) of the first embodiments.

Third Embodiment

Figure 7A:
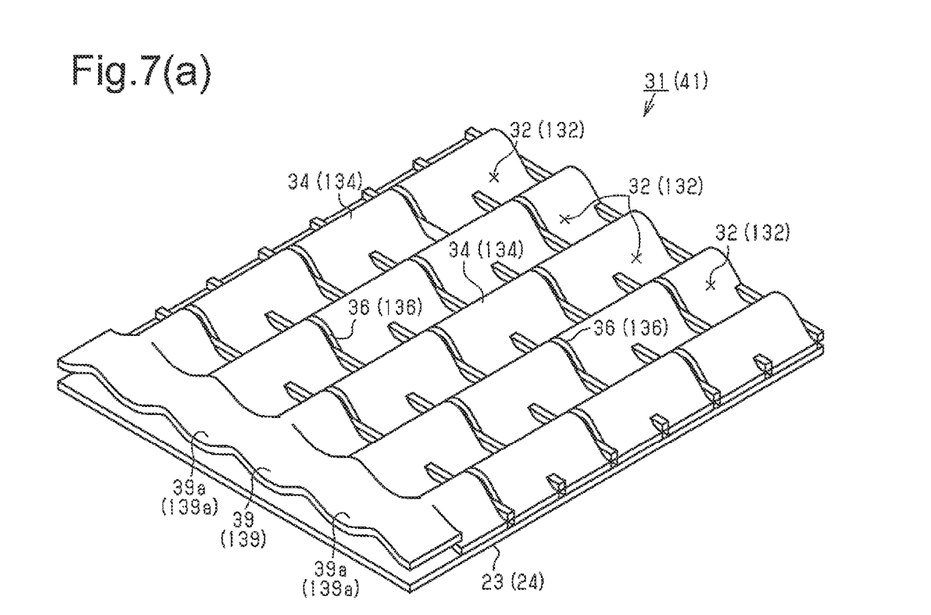
FIG. 7(a) is a perspective view showing first and second gas passage forming bodies according to a third embodiment of the present invention.
Figure 7B:
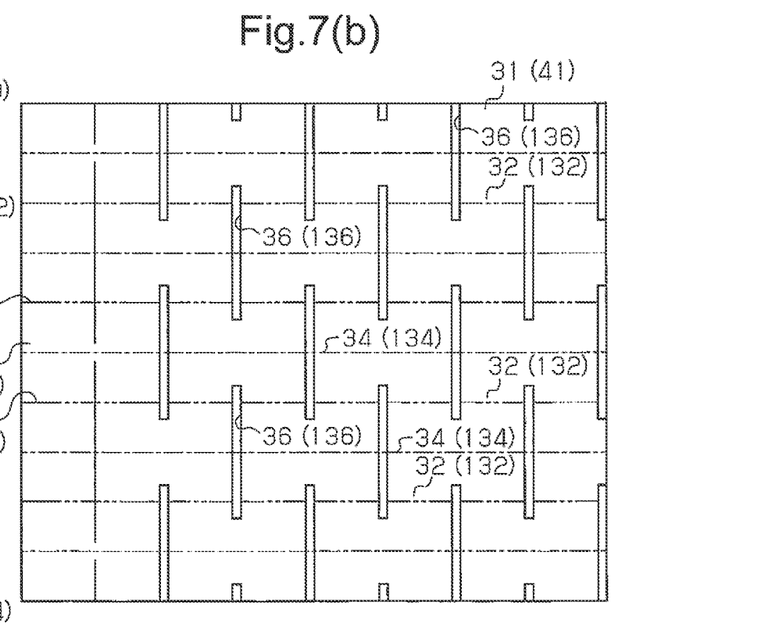
FIG. 7(b) is a partially simplified plan view showing the first and second gas passage forming bodies of the third embodiment.
Figure 7C:
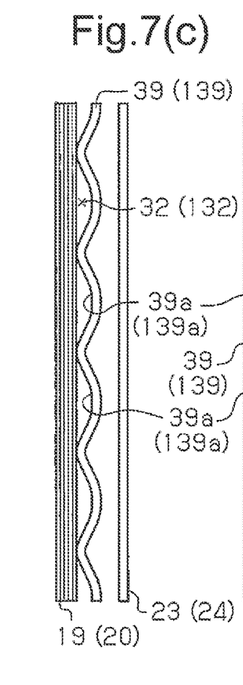
FIG. 7(c) is a side view showing the first and second gas passage forming bodies of the third embodiment as viewed from an end.

A third embodiment will now be described with reference to FIGS. 7(a) to 7(c).

The third embodiment is the same as the first embodiment in the following points. The third embodiment includes aid portions 39 and 139 that are integrally coupled to the downstream end surfaces of the projections 34 and 134 and the projections 35 and 135 and extend in the direction in which the water guide passages 33 and 133 are adjacent to one another. Also, the aid portions 39 and 139 extend over the entire water guide passages 33 and 133 and are separated from the separators 23 and 24. The third embodiment differs from the first embodiment in the following points. As shown in FIGS. 7(a) and 7(c), the aid portions 39 and 139 of the third embodiment are undulated at the same pitch as the projections 34 and 134, and portions 39a and 139a, which form valleys of the aid portions 39 and 139, are separated from the first separator 23 (second separator 24), whereas the aid portions 39 and 139 of the first embodiment are flat. FIG. 7(c) shows the aid portions 39 and 139 of the third embodiment but does not show components that would be located behind the plane of the drawing, such as the projections 34, to simplify the illustration. The third embodiment also obtains advantages (1), (2), and (4) of the first embodiment.

The fuel battery and the gas passage forming bodies of the third embodiment include the undulated aid portions, which aid the bonding of water drained from the water drainage ends of the water guide passages 33 and 133. Thus, the aid portions reliably capture water droplets discharged from the water drainage ends of the water guide passages 33 and 133 and aid the bonding of water droplets discharged from adjacent ones of the water guide passages.

Fourth Embodiment

Figure 8A:
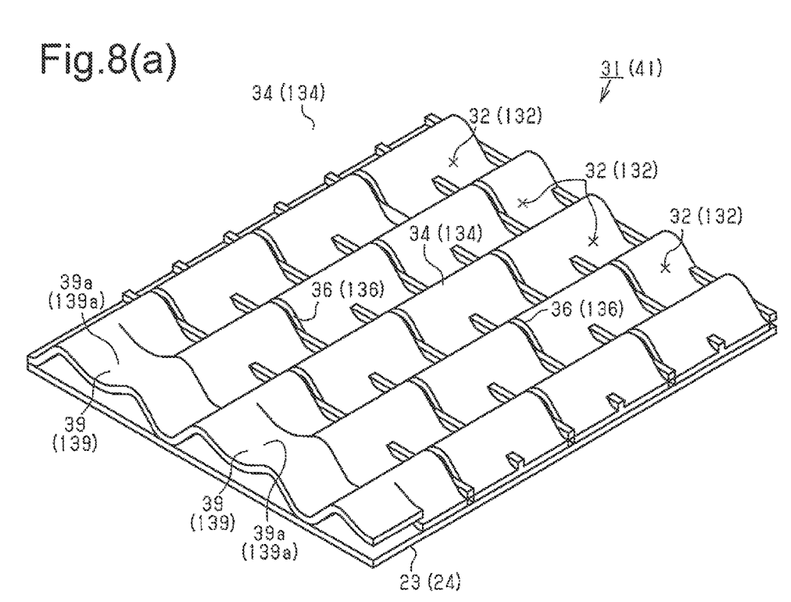
FIG. 8(a) is a perspective view showing first and second gas passage forming bodies according to a fourth embodiment of the present invention.
Figure 8B:
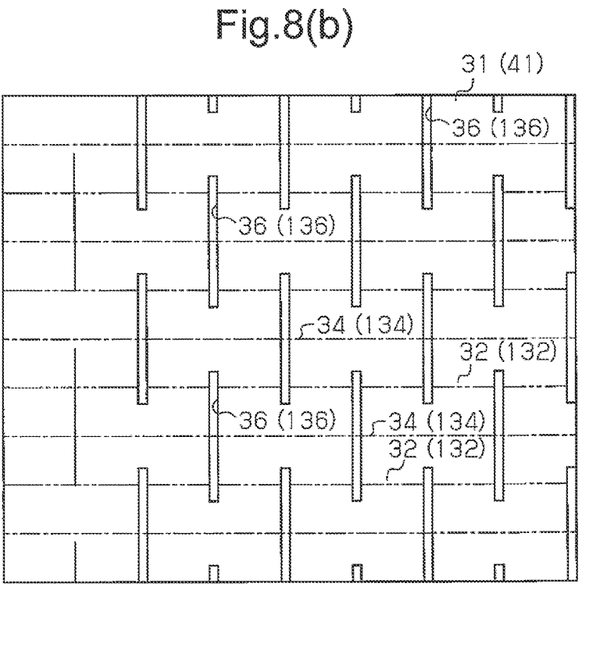
FIG. 8(b) is a partially simplified plan view showing the first and second gas passage forming bodies of the fourth embodiment.

A fourth embodiment will now be described with reference to FIGS. 8(a) to 8(c). The fourth embodiment is a modified example of the third embodiment. The aid portions 39 and 139 of the third embodiment extend in the direction, in which the water guide passages 33 and 133 are adjacent to one another, and over the entire water guide passages 33 and 133. The fourth embodiment differs from the third embodiment as follows. The aid portions 39 and 139 extend in the direction, in which the water guide passages 33 and 133 are adjacent to each other, and partially extend over groups of the water guide passages 33 and 133. That is, in FIG. 8(*a*), the aid portion 39 is arranged in some of the pairs of adjacent ones of the water guide passages 33 and 133. The aid portions 39 and 139 of the fourth embodiment are also undulated.

Figure 8C:
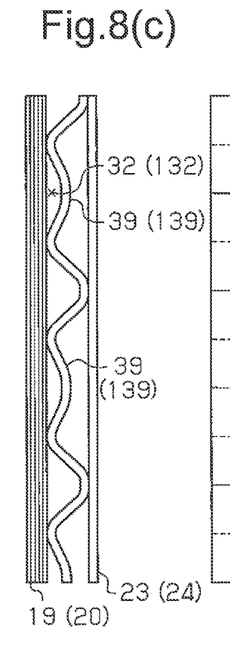
FIG. 8(c) is a side view showing the first and second gas passage forming bodies of the fourth embodiment as viewed from an end.

FIG. 8(*c*) shows the aid portions 39 and 139 of the fourth embodiment but does not show components behind the drawing, such as the projections 34, to simplify the illustration. The fourth embodiment also obtains advantages (1), (2), and (4) of the first embodiment.

Fifth Embodiment

A fifth embodiment will now be described with reference to FIGS. 9(*a*) and 9(*b*).

Figure 9A:
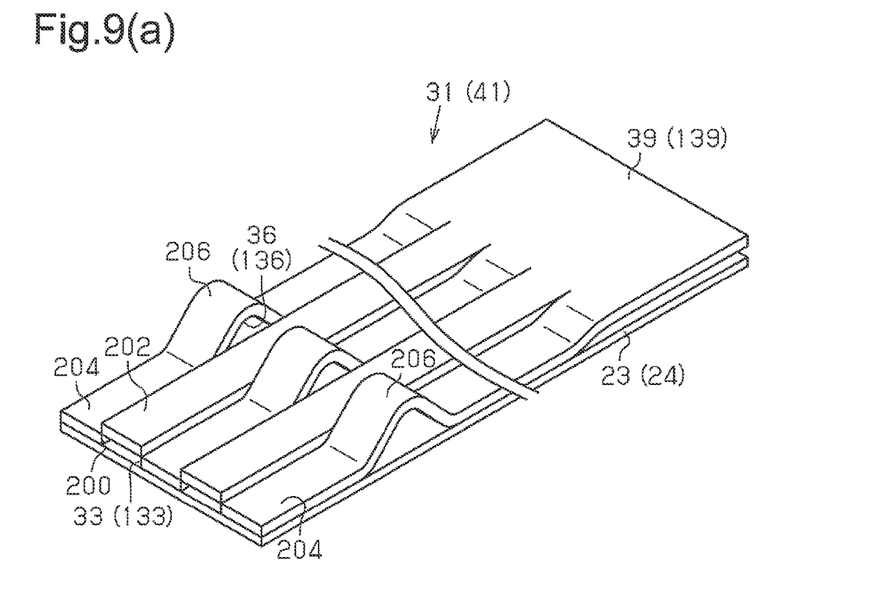
FIG. 9(a) is a partially removed perspective view showing first and second gas passage forming bodies according to a fifth embodiment of the present invention.

Referring to FIG. 9(*a*), the first gas passage forming body 31 and the second gas passage forming body 41 of the fifth embodiment are formed by a plate material formed from a ferrite stainless steel (SUS), a titanium alloy, or carbon, in the same manner as the first embodiment. The first and second gas passage forming bodies 31 and 41 include aid portions 39 and 139 at ends located at outlet sides of the gas passages. The aid portions 39 and 139 are flat and extend in the lateral direction (direction orthogonal to the gas flow direction). A plurality of strips 202 and 204 alternately form steps and extend from the aid portions 39 and 139 toward inlets of the gas passages. Although FIG. 9(*a*) shows only a small number of the strips 202 and 204 to simplify the illustration, a large number of strips are alternately arranged in the lateral direction.

The strips 204 are in contact with the first separator 23 (second separator 24). The strips 202 are separated from the first separator 23 (second separator 24). The separation of the strip 202 from the first separator 23 (second separator 24) forms a space surrounded by the two strips 204, the first separator 23 (second separator 24), and the strip 202. The space functions as the water guide passage 33 (133). The water guide passage 33 (133) includes a groove 200 formed by the two strips 204 and the strip 202. The strip 202 functions as a separator or a separation member that separates the gas passage and the water guide passage.

Therefore, as shown in FIG. 9(*a*), the first and second gas passage forming bodies 31 and 41 include a plurality of the grooves 200 in the lateral direction so that water guide layers are alternately formed.

Figure 9B:
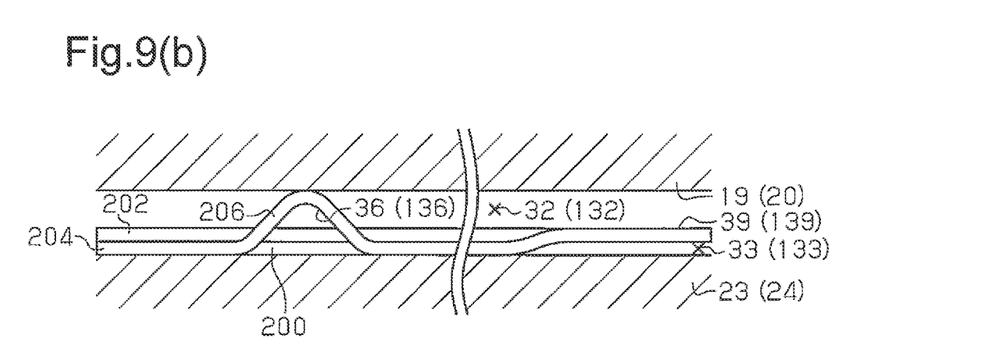
FIG. 9(b) is a side view showing the first and second gas passage forming bodies of the fifth embodiment as viewed from an end.

As shown in FIG. 9(*b*), the distance of the strip 202 from the first separator 23 (second separator 24), that is, the height of the strip 202, is the same as the height of the aid portion 39 (139).

The strips 204 are coupled to the aid portion 39 (139) by slopes. The slope shortens the distance of the strip 204 from the first separator 23 (second separator 24). The strips 204 are in contact with the first separator 23 (second separator 24) except at the slopes and projections 206, which will be described later.

The strips 204 include the projections 206 that are in contact with the gas diffusion layer 19 (20). The strips 202 are directly coupled to sides of the projections 206 of the strips 204.

When the projections 206 of the strips 204 are in contact with the gas diffusion layer 19 (20), the gas passages 32 (132) are formed between the strips 202 and the gas diffusion layer 19 (20).

The gas passages 32 (132) are formed in the thicknesswise direction of the first gas passage forming body 31 (gas passage forming body 41) relative to the water guide passages 33 (133).

A space defined by the projection 206 at a side of the first separator 23 (second separator 24) is in communication with the gas passage 32 (132) by the communication passage 36 (136). That is, the communication passages 36 (136) are arranged between the gas passages 32 (132) and the water guide passages 33 (133). Water moves through the communication passages 36 (136), which communicate the gas passages 32 (132) and the water guide passages 33 (133). The fifth embodiment also obtains advantages (1), (3), and (4) of the first embodiment.

Although the fifth embodiment includes one projection 206 in each strip 204, each strip 204 may include a plurality of the projections 206.

The first to fifth embodiments may be modified as follows.

In the above embodiments, the first and second gas passage forming bodies 31 and 41 are separated from the first and second separators 23 and 24. However, at least one of the first and second gas passage forming bodies 31 and 41 may be arranged integrally with the separator.

In the above embodiments, the gas passages 32 and 132 and the water guide passages 33 and 133 extend in straight lines. However, the shape is not limited to such straight lines and thus may be another form such as a curved line.

In the above embodiments, each of the first and second gas passage forming bodies 31 and 41 includes the corresponding aid portion 39 and 139. Instead, only one of the first and second gas passage forming bodies 31 and 41 may include the aid portion.

The aid portion of the second embodiment bridges three water guide passages. However, the number of the water guide passages not limited to three. The aid portion only needs to extend over two or more water guide passages. Additionally, the number of the aid portions arranged in the gas passage forming body of the second embodiment is not limited to one.

The gas diffusion layers 19 and 20 may be omitted from the membrane electrode assembly 15 of the above embodiments. In this case, the first gas passage forming body 31 is in contact with the first electrode catalyst layer 17, and the second gas passage forming body 41 is in contact with the second electrode catalyst layer 18.

DESCRIPTION OF THE REFERENCE SYMBOLS

11: fuel battery, 15: membrane electrode assembly, 16: solid polymer electrolyte membrane, 17: first electrode catalyst layer, 18: second electrode catalyst layer, 19: first gas diffusion layer, 20: second gas diffusion layer, 23: first separator, 24: second separator, 31: first gas passage forming body, 32: gas passage, 33: water guide passage, 36: communication passage, 39: aid portion, 41: second gas passage forming body, 132: gas passage, 133: water guide passage, 136: communication passage, 139: aid portion.

The invention claimed is:

1. A gas passage forming body for a fuel battery, wherein the fuel battery includes a membrane electrode assembly and a separator, the membrane electrode assembly includes a solid polymer electrolyte membrane and electrode catalyst layers laminated on an anode surface and a cathode surface of the solid polymer electrolyte membrane, the gas passage forming body is arranged between the membrane electrode assembly and the separator, the gas passage forming body including a plurality of gas passages and a plurality of water guide passages, the gas passage forming body including a wave shaped separating wall defining a plurality of first projections and a plurality of second projections, each of the plurality of gas passages being provided between an adjacent pair of the first projections, and each of the plurality of water guide passages being provided between an adjacent pair of the second projections, a communication passage is arranged between at least one of the water guide passages and one of the gas passages that is adjacent to the at least one water guide passage and is in communication with the water guide passage and the gas passage, to permit water to move therethrough, and an aid portion is arranged at water drainage ends of two adjacent ones of the water guide passages, wherein the aid portion defines a space that connects the two adjacent ones of the water guide passages and aids bonding of water drained from the water drainage ends of the two adjacent water guide passages.

2. The gas passage forming body for a fuel battery according to claim 1, wherein
the gas passages are groove-shaped,
the water guide passages are separated from the gas passages by a partition wall, and
the aid portion extends in a direction in which the water guide passages are adjacent to each other.

3. The gas passage forming body for a fuel battery according to claim 2, wherein the aid portion is arranged at water drainage ends of all or some of the water guide passages.

4. The gas passage forming body for a fuel battery according to claim 2, wherein the aid portion is flat.

5. The gas passage forming body for a fuel battery according to claim 2, wherein the aid portion has a height lower than that of the water guide passages.

6. A fuel battery comprising a plurality of stacked unit cells, wherein
each of the unit cells includes a membrane electrode assembly,
each of the membrane electrode assemblies includes a solid polymer electrolyte membrane, electrode catalyst layers laminated on an anode surface and a cathode surface of the solid polymer electrolyte membrane, and a gas diffusion layer laminated on an outer side of each of the electrode catalyst layers,
each of the unit cells further includes a gas passage forming body, which is stacked on each of the gas diffusion layers of the membrane electrode assembly, and two separators sandwiching the membrane electrode assembly, and
at least one of the gas passage forming bodies is formed by the gas passage forming body according to claim 1.

* * * * *